United States Patent [19]
Seal et al.

[11] Patent Number: 4,668,386
[45] Date of Patent: May 26, 1987

[54] WATER QUALITY MONITOR

[75] Inventors: J. David Seal, Brookfield; Jeffrey G. Franks, Greenfield, both of Wis.

[73] Assignee: Autotrol Corporation, Milwaukee, Wis.

[21] Appl. No.: 769,301

[22] Filed: Aug. 26, 1985

[51] Int. Cl.⁴ ............................................. B01J 47/14
[52] U.S. Cl. ...................... 210/91; 210/93; 210/96.1
[58] Field of Search ............................ 210/662, 85–87, 210/91, 93, 94, 104, 105, 109, 96.1, 190, 191, 269, 100

[56] References Cited
U.S. PATENT DOCUMENTS

| | | | |
|---|---|---|---|
| 2,278,488 | 4/1942 | Ralston | 210/282 |
| 2,810,692 | 10/1957 | Calmon | 210/25 |
| 3,250,392 | 5/1966 | Luck | 210/96 |
| 3,477,576 | 11/1969 | Luck et al. | 210/96 |
| 3,574,330 | 4/1971 | Prosser | 210/96 |
| 4,332,678 | 6/1982 | Spiegl | 210/86 |
| 4,385,992 | 5/1983 | Clauer et al. | 210/662 |

Primary Examiner—Ivars Cintins
Attorney, Agent, or Firm—Quarles & Brady

[57] ABSTRACT

A water quality monitor receives water that has passed through a water softener treatment tank. The monitor contains a sample of ion exchange resin that is exposed to the water and which shrinks in volume when the water quality deteriorates to the point where it is no longer being softened. Shrinking of the resin sample signals that corrective action should be taken, such as regenerating the softener. Signaling may be a visual or audible signal or it may involve closing a valve preventing the flow of service water to one or more points of use, or restricting the flow to the extent that the restricted flow constitutes a signal to the user. The sample ion exchange resin is contained in a replaceable cartridge that can be inserted into the monitor and replaced after the monitor has functioned to signal deteriorating quality.

5 Claims, 4 Drawing Figures

WATER QUALITY MONITOR

BACKGROUND OF THE INVENTION

This invention relates to the control of the quality of drinking water, and particularly to a mechanism for monitoring the water quality to prevent the use of water that is not being adequately treated until corrective measures have been taken.

In certain geographical areas the water supply contains levels of radioactivity in excess of the limits established by primary drinking water regulations. The source of this radioactivity is naturally occuring and is found where the water supply is obtained from deep wells in an acquifer that contains radioactive rock. Levels of radioactivity are very low, but a value of twice the current limit established by the regulations is not uncommon. The sources of the radioactivity in the water are metallic ions that are easily removed from the water by the common ion exchange process used to soften water.

Although the solution to the removal of the radioactivity is quite simple since a common water softener can be used, such softeners require periodic regeneration because they lose their effectiveness as the ion exchange material becomes completely or nearly completely saturated with the removed ions. Thus, some mechanisms must be provided to insure that the softeners are being regenerated periodically and that the softening process is operating to remove the radioactivity. At the same time, the mechanism should, preferably, prevent the consumption of inadequately treated water.

One aspect of the invention involves a water quality monitor that includes a sensor that is exposed to the treated water leaving the water softener. The sensor responds to the change in the quality of the water leaving the softener. When the ion exchange resin of the softener becomes exhausted to a predetermined degree, the sensor will actuate signaling means that indicates to the user that the water quality has deteriorated to an unacceptable level and that corrective action should be taken. The sensor continues to actuate the signaling means until the spent sensor is replaced with a fresh sensor. The signaling means can provide a visual or audible signal or actuate a valve in the service line leading from the softener so that the flow of water at a point of usage will be restricted or entirely halted. The sensor preferably includes a small quantity, or sample of an ion exchange resin that changes volume significantly as it absorbs calcium ions.

SUMMARY OF THE INVENTION

One aspect of the invention involves a water quality monitor that includes a sensor that is exposed to the treated water leaving the water softener. The sensor responds to the change in the quality of the water leaving the softener. When the softening capacity of the ion exchange resin of the softener becomes depleted to a predetermined degree, the sensor will actuate signaling means that indicates to the user that the water quality has deteriorated to an unacceptable level and that corrective action should be taken. The sensor continues to actuate the signaling means until the spent sensor is replaced with a fresh sensor. The signaling means can provide a visual or audible signal or actuate a valve in the service line leading from the softener so that the flow of water at a point of usage will be restricted or entirely halted. The sensor preferably includes a small quantity, or sample of an ion exchange resin that changes volume significantly as it absorbs calcium ions.

In accordance with another aspect of the invention, a water quality monitor is inserted into the service line leading from the water softener to the faucet or other point of consumption. The monitor includes a water quality sensor that responds to a deterioration in the quality of the water passing through the service line and which actuates a control valve within the monitor that closes or restricts the service line to prevent the normal flow of service water to the point of consumption.

In accordance with a preferred embodiment of the invention, the sensor is a replaceable element which after it has signaled poor water quality must be discarded and replaced with a new sensor thereby requiring the user to take affirmative corrective action to restore the quality of the drinking water supply. The sensor comprises a replaceable cartridge containing an ion exchange resin that will substantially change its volume as it encounters untreated water. The normal volume of the ion exchange resin is sufficient to hold a valve in an open position. However, this shrinkage of the ion exchange resin causes the valve to move closer to a valve seat until finally it seats and halts the flow of water through the service line.

It is a principal object of the invention to provide a monitor that responds to changes in water quality and signals when the quality falls below an acceptable level.

It is also an object of the invention to provide such a monitor that will restrict or halt the flow of water to the point of consumption when the water is being inadequately treated.

It is also an object of the invention to provide such a monitor that includes a replaceable sensor element which must be replaced before the normal flow of service water can resume.

It is a further object of the invention to provide such a water quality monitor for use in connection with water softening equipment that is capable of removing calcium ions and metallic, radioactive ions.

The foregoing and other objects and advantages of the invention will appear in the following detailed description. In the description reference is made to the accompanying drawing which illustrate a preferred embodiment of the invention.

DETAILED DESCRIPTION OF THE PREFERRED EMBODIMENT

Figure 1:
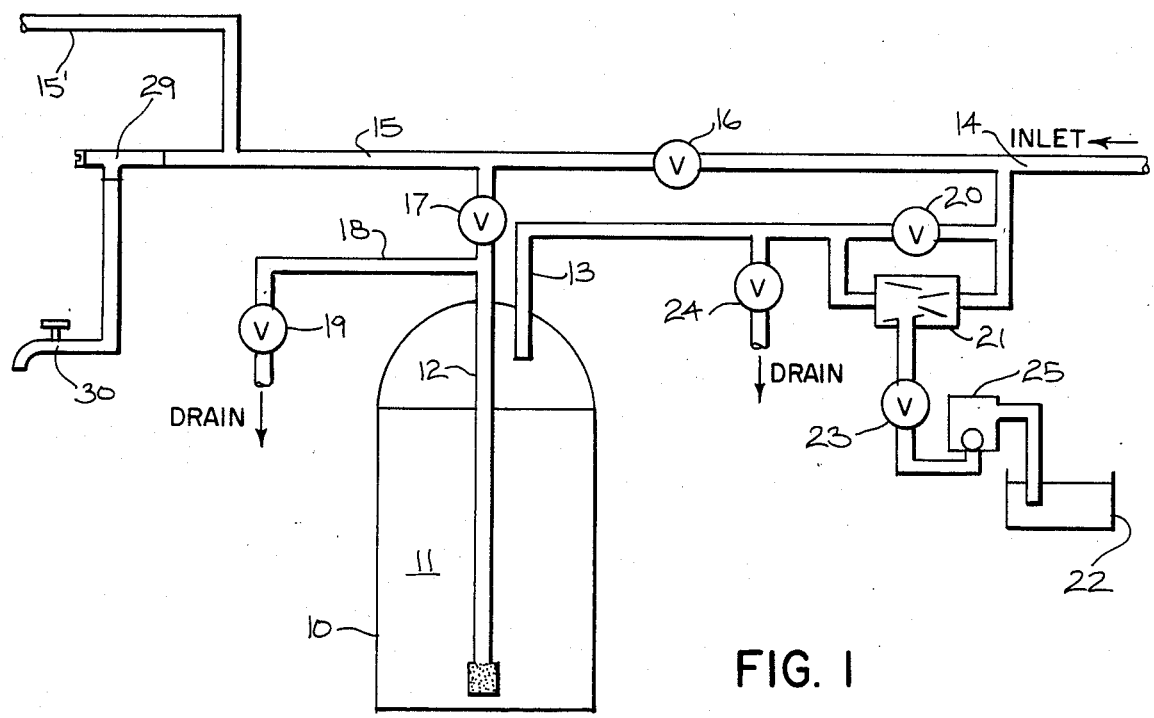
FIG. 1 is a schematic view of a water softening system in which a water quality monitor of the present invention has been inserted.

A known water softener system is illustrated schematically in FIG. 1. The system includes a softening tank 10 that contains a bed 11 of ion exchange resin. An outlet tube 12 extends through the bed 11 from a point adjacent the bottom of the bed. An inlet pipe 13 extends into the softener tank 10 and has its discharge opening above the level of the bed 11. Raw water is delivered to an inlet line 14 and treated water is delivered to a service line 15. The inlet line 14 and service line 15 may be connected through a normally closed service valve 16. A second service valve 17 is normally open and is interposed between the outlet tube 12 and the service line 15. A drain line 18 containing a normally closed drain valve 19 also extends from the outlet tube 12.

Raw material can be delivered to the inlet pipe 13 through a service inlet valve 20. Alternatively, the raw water entering the inlet line 14 can pass through a brine ejector 21 to withdraw brine from a brine tank 22 when a brine inlet valve 23 is opened and when the service inlet valve 20 is closed. The withdrawn brine will be delivered to the inlet pipe 13 of the softener. The inlet pipe 13 is also connectable to drain through a second normally closed drain valve 24. An air check valve 25 prevents air from being injected into the system when the brine in the tank has been withdrawn to a certain level.

During service operation, the drain valves 19 and 24, the first service vavle 16 and a brine inlet valve 23 would all be closed while the second service valve 17 and the service inlet valve 20 would both be open. Raw water will then flow from the inlet line 14 through the inlet pipe 13 onto the top of the resin bed 11. The water will pass through the bed 11 and treated water will be withdrawn from the bottom of the bed 11 through the output tube 12 to the service line 15.

This treatment of water will remove the calcium ions which cause hardness in water and exchange them for sodium ions that have been charged on the ion exchange resin from the brine. This same typical ion exchange resin used in softeners will also remove the metallic ions, such as radium, that cause radioactivity in the water supply. However, the ion exchange resin bed 11 will eventually become exhausted and will be incapable of removing the calcium or metallic ions. The ion exchange resin bed 11 can be returned to a productive operating condition by regenerating the bed with brine from the tank and by rinsing the bed.

To regenerate the bed 11, a control will typically first close the service inlet valve 20 and open the first service valve 16 and the second drain valve 24. Raw water from the inlet line 14 can then be fed to the outlet tube 12 to backwash the resin bed 11 with the backwash water exiting through the inlet pipe 13 to the drain through the now open second drain valve 24.

The backwash is followed by a brining and rinse. For this operation, the second service valve 17 and the second drain valve 24 will be closed, while the brine inlet valve 23 and the first drain valve 19 are opened. Brine is then drawn from the brine tank 22 through the air check valve 25 and the open brine valve 23 and discharged into the tank 10 through the inlet pipe 13. The brine will pass through the resin bed 11 and regenerate the bed by exchanging the calcium and metallic ions for sodium ions. The brine will exit to drain through the outlet tube 12 and the now open first drain valve 19. When the contents of the brine tank 22 have been exhausted, the air check valve 25 will close to prevent air from being injected into the system, and raw water will continue to flow through the injector 21 free of brine. This water will function to rinse the resin bed 11 to remove excess brine. During the final stage of regeneration, the brine tank 22 is refilled and the softener bed 11 is purged. This is accomplished by opening the service inlet valve 20. Raw water can then enter the brine tank 22 through the open brine valve 23 and can enter the softener tank 10 through the inlet pipe 13. Water passing through the bed 11 will exit to the drain 19. The apparatus is returned to a service condition by closing the first service valve 16, the first drain valve 19 and the brine inlet valve 23. What has been described thus far is known operation of water softener systems.

When a water softener system is used to remove the hardness from water nothing untoward results if the user allows the bed to become exhausted without generating the bed and consumes hard water as a result. If the water supply is contaminated with radioactivity, however, the ingestion of untreated water is obviously more serious. Thus, the monitor of this invention at the minimum signals the existence of an untreated condition, and preferably prevents the flow of untreated water to the point of consumption. To this end, the monitor 29 is physically disposed between the service line 15 and the faucet 30 or other point of use.

Figure 2:
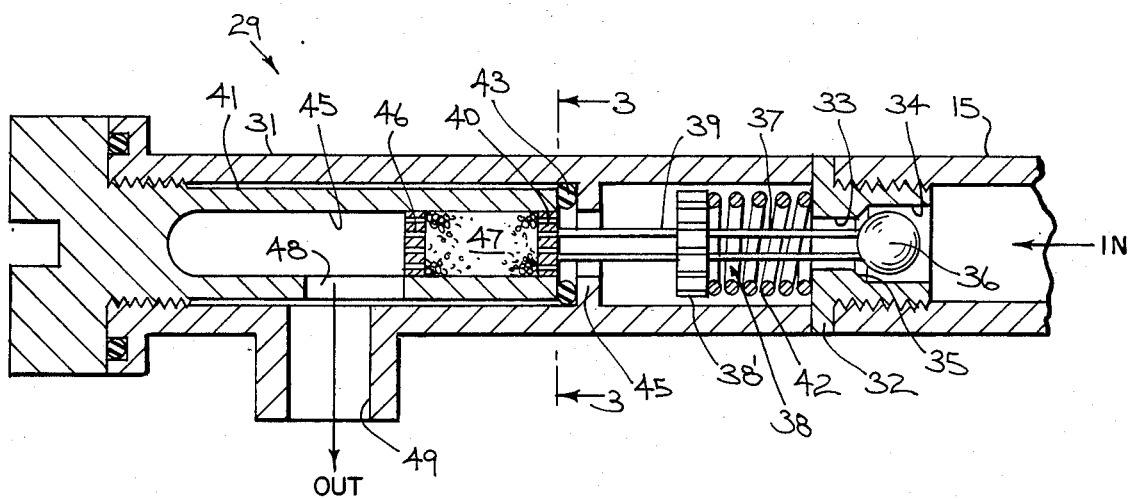
FIG. 2 is a view in vertical section taken through a monitor in accordance with the present invention.
Figure 3:
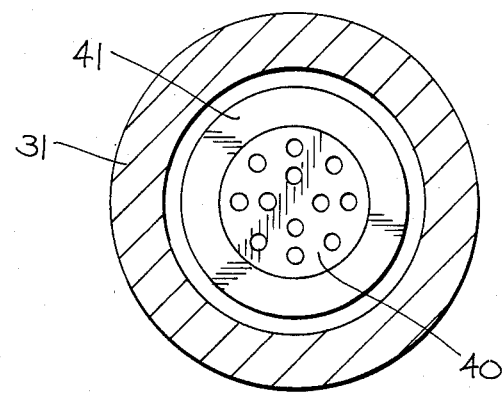
FIG. 3 is a view in vertical section taken in the plane of the line 3—3 of FIG. 2.

As shown particularly in FIGS. 2 and 3, the monitor 29 has a housing formed from an elongated cylindrical body 31 with an end piece 32 attached to one end of the body 31. The body 31 and end piece 32 may be formed from a molded plastic material and the end piece 32 can be joined to the body 31 by sonic, solvent, spin or heat welding, as examples. The end piece 32 is externally threaded to be received into the internally threaded end of the service pipe 15. The end cap 32 has a narrow central passage 33 and an enlarged passage 34 with a valve seat 35 forming the transition between the passages 33 and 34. A ball valve 36 is disposed within the enlarged passage 34. The ball valve 36 is engaged by the legs 37 of an actuator member 38 that has a central perforated disclike body 38'. Another set of legs 39 extend from the opposite side of the body 38' and are adapted to engage a movable perforated disc 40 at one end of a replaceable cartridge 41.

As shown in FIG. 2, the legs 39 of the actuator 38 are held in contact with the movable disc 40 by a spring 42. The cartridge 41 has a circular cylindrical body that is threaded into the body 31. When the cartridge 41 is fully seated within the body 31, it compresses an O-ring seal 43 held between the cartridge 41 and a shoulder 44.

The perforated disc 40 forms one end of a resin specimen chamber within a central blind passage 45 in the cartridge 41. The specimen chamber is further defined by a stationary perforated disc 46 spaced from the disc 40 and the space between the discs is filled by an ion exchange resin 47 that exhibits a large volumetric change as it absorbs calcium ions. The passage 42 in the cartridge 41 opens to a side outlet 48 which registers with an outlet 49 of the body 31. The outlet 49 is connected to the faucet 30.

When the resin specimen 47 is in its expanded condition, which it would be when it is first installed, the actuator 38 is positioned so as to hold the ball 36 away from the valve seat 35. In that condition, service water can flow past the ball 36, through and around the actuator 38, through the movable disc 40, through the resin specimen 47, through the fixed disc 46, and out the outlets 48 and 49 to the faucet 30.

If the softening capacity of the resin bed 11 of the softener becomes depleted to the point where it affects the quality of the effluent from the softener, this condition will be reflected in the quality of the water passing through the monitor 29. The water leaving the softener will exhibit an increase in calcium and metallic ions. This will have the effect of causing the resin specimen 47 in the cartridge 41 to remove these calcium and metallic ions, and this will cause the resin specimen 47 to shrink in volume. The movable disc 40 will be moved under the action of the spring 42 towards the fixed disc 46 as the resin 47 shrinks until a point is reached at which the ball 36 will be seated against the valve seat 35 and all flow through the monitor will cease. Before flow is completely halted, the flow will decrease and this will signal the user that a poor water quality condition is developing. Either the reduction or elimination of flow from the faucet 30 will require corrective action by the user before full flow will occur. No further water can be drawn through the faucet 31 until corrective action is taken.

The corrective action includes causing the softener to be cycled through a regeneration cycle including backwashing, rinsing and brining of the ion exchange bed 11. The corrective action also includes the replacement of the cartridge 41 with a new cartridge in which the ion exchange resin specimen 47 is in its unexhausted fully expanded condition. Insertion of a new cartridge 41 will move the actuator 38 to unseat the ball valve 36 to completely open and allow full flow of service water through the monitor once again.

If a previously used cartridge 41 is installed as a replacement, the ball valve 46 will not open because it will not be physically unseated. If the softener has not been regenerated but a new cartridge is installed, the new cartridge will very shortly be in a condition in which the ion exchange resin specimen 47 will have shrunk to again signal a poor water quality.

The embodiment of FIGS. 2 and 3 will completely halt the flow of service water if the water quality becomes very poor. As an alternative, the flow may be allowed to continue, although at a significantly reduced rate. This could be accomplished by providing axial grooves in the valve seat 35 so that the ball valve 36 cannot completely seal the passage 33.

Figure 4:
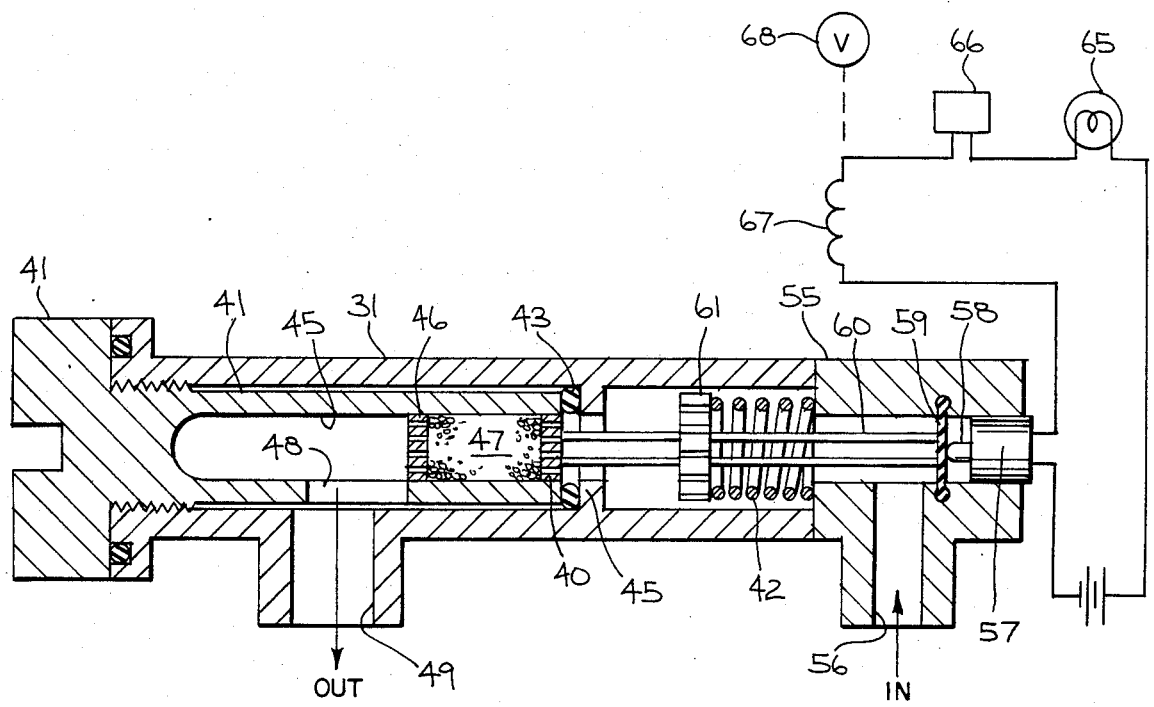
FIG. 4 is a schematic view including a view in vertical section through an alternate embodiment of the monitor according to the invention.

Instead of signaling poor water quality by halting or restricting flow at the point of consumption, the monitor can be used to give a visual or audible signal to the user. As shown in FIG. 4, the monitor may be modified by replacing the end piece 32 with an alternate end piece 55 that has an inlet passage 56 for receiving water from the service line 15. The end piece 55 mounts a normally open switch 57 having a switch actuator 58 which closes the switch 57 when the actuator 58 is released. The switch actuator 58 bears against one side of a membrane 59, the other side of which is engaged by or attached to the legs 60 of a modified actuator 61. When the resin specimen 47 shrinks to a predetermined extend, the switch 57 will close thereby energizing a light 65 or a buzzer 66, or both.

Also as shown in FIG. 4, the switch 57 can be used to control the energization of a solenoid 67 of a solenoid controlled valve 68. The valve 68 may be inserted in the service line 15 to block the flow of service water when actuated. In such an arrangement the monitor need not be physically inserted in the service line but can simply sample service water from a sampling line (not shown) leading from the service line 15.

It should be understood that under normal operation of a water softener, regeneration is signaled either by a timer or by automatic sensing well before the ion exchange bed 11 of the softener tank is fully exhausted. Therefore, the monitor of this invention functions to signal poor water quality only in those rare instances in which an excessive amount of water is drawn from the water softening system before the time for regeneration has occurred or there is a condition of malfunction of the softening system such as an inadequate salt supply to provide sufficient brine for regeneration. In most installations the monitor may never function to halt the water supply or otherwise signal poor water quality. However, very minor hardness leakage through the monitor over a period of time, such as one year, may cause the ion exchange resin specimen 47 to shrink to the point where the monitor will actuate to signal the user. This aging of the monitor will also require replacement of the cartridge but it has the advantage of insuring periodic replacement with a fresh cartridge that will operate properly.

The by-passing of raw water during regeneration would deliver untreated water and thereby cause the monitor to actuate. As a result, a valve may be installed on the service line that will close during regeneration to insure that all regeneration fluids are delivered to drain and that no untreated water is by-passed to service during regeneration. The valves 16 and 17 of the system of FIG. 1 can be used for that purpose.

As shown in FIG. 1, the monitor 29 can be associated with a particular point of consumption such as the faucet 30. This could be the kitchen faucet in a dwelling, since that is the source from which water ingestion is usually obtained The service line 15 can then extend to other branch lines, such as the branch 15' to supply water to other points of use. In such an arrangement, only the flow to the one faucet is halted or reduced and flow of service water can continue to other points for uses, such as sanitary, where health risks are not involved. Alternately, a monitor 29 may be placed at each of multiple points of end use or the monitor 29 may be used only as a sampler. In the later case, only a very small portion of the service water can be caused to flow through the monitor 29 and the monitor can then produce a signal to alert the user of the poor water quality condition or to operate a remote valve, as described in relation to FIG. 4.

Although the invention has been described as being used to monitor a water softener system that uses the calcium-sodium cycle, it could as easily be used with systems that operate on the calcium-hydrogen cycle in which regeneration is accomplished with hydrochloric acid rather than with brine.

We claim:

1. In a water softener installation including a treatment tank and a service line leading from the tank, the combination therewith of a water quality monitor for insertion in the service line and comprising:

a housing including an inlet and an outlet connected in the service line;

a valve in said housing adapted when actuated to restrict the flow between the inlet and the outlets; and a removable cartridge mounted in said housing between the inlet and outlet and including a specimen of ion exchange resin that changes volume as it exchanges ions with the water being monitored, said valve being actuated when the specimen shrinks in volume to a predetermined extent in response to a deterioration in the quality of water.

2. In a water softener installation including a treatment tank and a service line leading from the tank, the combination therewith of a water quality monitor for insertion in the service line and comprising:

a housing including a central passage that functions as a continuation of the service line;

a valve in said housing adapted when actuated to restrict the flow through the central passage; and a sensor in the housing that is exposed to the water passing through the service line and which actuates the valve when the quality of the water declines to a predetermined degree;

said sensor including a specimen of ion exchange resin that changes in volume as the calcium ion content of the water increses.

3. A monitor in accordance with claim 2 wherein the sensor is removably inserted in the housing and must be replaced after the sensor has actuated the valve before the valve can be deactuated.

4. A monitor in accordance with claim 2 wherein the valve is a ball valve that is normally held open by a spring loaded actuator that bears against one face of the resin specimen.

5. In a water softener installation including a treatment tank and a service line leading from the tank, the combination therewith of a water quality monitor for connection to the service line and comprising:

a housing including an inlet for connection to the service line and an outlet;

a removable and replaceable cartridge mounted in said housing between said inlet and outlet, and including a specimen of ion exchange resin exposed to the water from the service line, said specimen shrinking in volume as it exchanges ions with the water;

an actuator fixed within said housing that is movable with change in volume of the resin specimen; and a switch fixed within said housing responsive to the movement of the actuator, said switch being actuated when the specimen shrinks to a predetermined extent.

* * * * *